US010171434B2

(12) United States Patent
Laxminarayan et al.

(10) Patent No.: US 10,171,434 B2
(45) Date of Patent: Jan. 1, 2019

(54) MANAGED DEVICE SCATTERNET ADMINISTRATION

(71) Applicant: AIRWATCH LLC, Atlanta, GA (US)

(72) Inventors: Akshay Laxminarayan, Bangalore (IN); Ramani Panchapakesan, Bangalore (IN)

(73) Assignee: AIRWATCH LLC, Atlanta, GA (US)

( * ) Notice: Subject to any disclaimer, the term of this patent is extended or adjusted under 35 U.S.C. 154(b) by 176 days.

(21) Appl. No.: 15/245,191

(22) Filed: Aug. 24, 2016

(65) Prior Publication Data

US 2017/0302638 A1    Oct. 19, 2017

(30) Foreign Application Priority Data

Apr. 14, 2016    (IN) .............................. 201641013086

(51) Int. Cl.
*H04L 29/06*    (2006.01)
*H04W 48/00*    (2009.01)
(Continued)

(52) U.S. Cl.
CPC ........ *H04L 63/045* (2013.01); *H04L 63/0823* (2013.01); *H04W 4/80* (2018.02);
(Continued)

(58) Field of Classification Search
CPC . H04L 63/062; H04L 63/0442; H04L 63/123; H04L 63/045; H04L 63/0823;
(Continued)

(56) References Cited

U.S. PATENT DOCUMENTS 6,584,566 B1 *    6/2003    Hardjono .............. H04L 9/0833
380/277
8,837,738 B2 *    9/2014    Huang .................. H04L 9/0836
380/281
(Continued)

OTHER PUBLICATIONS

Johansson et al., "JUMP Mode—A Dynamic Window-based Scheduling Framework for Bluetooth Scatternets", 2001, ACM, pp. 204-211 (Year: 2001).*

(Continued)

*Primary Examiner* — Matthew Smithers
(74) *Attorney, Agent, or Firm* — Thomas | Horstemeyer, LLP; Arvind R Reddy; Jason M Perilla (57) ABSTRACT

Managed device scatternet administration is described herein. In one example, to form a scatternet of managed devices, a network entry request including a unique device identifier and a public key is received from a client device. The public key is validated and the structure of the scatternet is examined to find an opening for the client device. After validation of the public key, network access data and a session key are encrypted by the public key and forwarded to the client device. The client device can use the network access data to find a network sublayer having the opening in the scatternet. At the same time, client admission data and the session key can also be sent to a sublayer propagator device of the network sublayer. After the client device enters the scatternet, management configuration data can be dispatched to it for device management.

20 Claims, 5 Drawing Sheets

(51) Int. Cl.
*H04W 4/80* (2018.01)
*H04W 84/18* (2009.01)

(52) U.S. Cl.
CPC ......... *H04W 48/00* (2013.01); *H04L 63/0876* (2013.01); *H04W 84/18* (2013.01)

(58) Field of Classification Search
CPC .... H04L 63/0876; H04W 4/80; H04W 48/00; H04W 84/18
See application file for complete search history.

(56) References Cited

U.S. PATENT DOCUMENTS

| | | | | |
|---|---|---|---|---|
| 9,894,631 | B2* | 2/2018 | Popa | H04W 60/04 |
| 2003/0037033 | A1* | 2/2003 | Nyman | H04L 29/12264 |
| 2003/0235309 | A1* | 12/2003 | Struik | H04L 63/065 |
| | | | | 380/278 |
| 2005/0152305 | A1* | 7/2005 | Ji | H04L 45/54 |
| | | | | 370/328 |
| 2005/0243765 | A1* | 11/2005 | Schrader | H04L 41/00 |
| | | | | 370/328 |
| 2005/0250445 | A1* | 11/2005 | Hansson | H04W 40/00 |
| | | | | 455/41.2 |
| 2005/0254471 | A1* | 11/2005 | Zhang | H04W 74/06 |
| | | | | 370/338 |
| 2006/0128402 | A1* | 6/2006 | Lee | H04W 72/082 |
| | | | | 455/464 |
| 2007/0019672 | A1* | 1/2007 | Guthrie | H04W 88/06 |
| | | | | 370/466 |
| 2009/0086973 | A1* | 4/2009 | Buddhikot | H04L 9/0822 |
| | | | | 380/273 |
| 2010/0097969 | A1* | 4/2010 | De Kimpe | H04W 52/0216 |
| | | | | 370/311 |
| 2015/0379543 | A1* | 12/2015 | Ronco | G06Q 30/0214 |
| | | | | 705/14.16 |

OTHER PUBLICATIONS

Beutel et al., "Scalable Topology Control for Deployment-Support Networks", 2005, IEEE, pp. 1-5. (Year: 2005).*

Yu et al., "Secure Constructing Bluetooth Scatternet Based on BTCP", 2009, IEEE, pp. 200-203. (Year: 2009).*

* cited by examiner

MANAGED DEVICE SCATTERNET ADMINISTRATION

RELATED APPLICATION

Benefit is claimed under 35 U.S.C. 119(a)-(d) to Foreign Application Serial No. 201641013086 filed in India entitled "MANAGED DEVICE SCATTERNET ADMINISTRATION", filed on Apr. 14, 2016, by AIRWATCH LLC, which is herein incorporated in its entirety by reference for all purposes.

BACKGROUND

Today, large numbers of computing devices connect to each other over the Internet and similar types of public or private computer networks. In that way, those computing devices have access to various types of electronic documents and other files and can communicate them among each other. Additionally, among other capabilities, those computing devices can be coordinated to work together in the performance of various processing tasks. Generally, the network topology of a computer network is related to the arrangement with which computer systems and devices are connected to each other in the computer network. Network topologies can be defined in terms of both physical and logical arrangements of networks.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

As noted above, large numbers of computing devices can be connected to each other over the Internet and similar types of public or private computer networks. In certain situations, however, it may be desirable to create one or more subnetworks among computing devices. For example, to prevent tens, hundreds, thousands, or more computing devices from attempting to obtain the same file from a single server computer on the Internet at nearly the same time, a subnetwork can be created. Through the subnetwork, one computing device can obtain the file from the server computer and distribute it among other computing devices in the subnetwork in an organized, tiered, or nested fashion. In that way, a significant burden on the server computer can be avoided. Further, when created and managed properly, computing devices can be directed to form secure subnetworks of managed devices.

In the context outlined above, various concepts of managed device scatternet administration are described herein. In one example, to form a scatternet of managed devices, a network entry request including a unique device identifier and a public key is received from a client device. Upon validation of the public key by a certificate authority, the structure of the scatternet is examined to find an opening for the client device. In turn, network access data and an encryption session key are encrypted by the public key and forwarded to the client device. The client device can use the network access data to find a network sublayer having the opening in the scatternet. At the same time, client admission data and the session key can also be sent to a sublayer propagator device of the network sublayer. After the client device enters the scatternet, management configuration data, compliance rules, etc. can be dispatched to it for management of the client device.

Client devices can also request to exit the scatternet and, as necessary, the scatternet can be reconfigured to adjust its network topology to account for the entry and exit of client devices to and from the scatternet over time. As formed, the scatternet can provide a secure network for communications among various client devices and also a means to manage certain operating parameters and compliance of the client devices according to device management concepts and principles.

A top-level computing device in the scatternet can act as an administrator of the rest of the client devices in the scatternet. As one example of the management of client devices in the scatternet, applications executing on the client devices can be managed by a type of anchor or manager application executing on the top-level computing device of the scatternet. This anchor or manager application can share or dispatch control, management, or configuration data to the applications executing on the client devices in the scatternet to manage various aspects of their operation. The data can require that certain operational parameters of the client devices be maintained and/or that certain compliance rules are adhered to. The control, management, or configuration data can also restrict client devices from performing certain operations, such as accessing certain applications, device peripherals, data, or networks. The data can also require or restrict the performance of certain operations by client devices based on various rules or conditions. Through the manager application, the top-level computing device can also control or restrict the operation of the display screen, camera, microphone, speaker, and other peripherals of the client devices.

Figure 1:
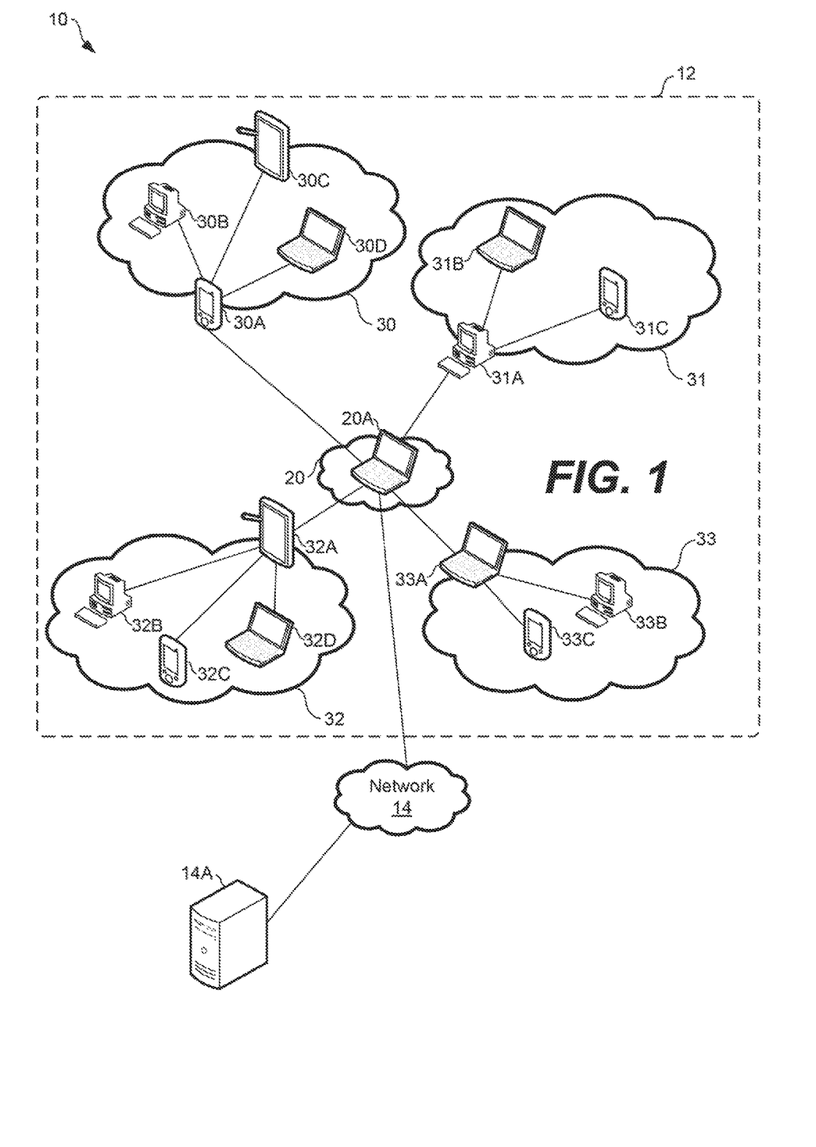
FIG. 1 illustrates an example networked environment for managed scatternet administration according to various examples described herein.

Turning to the drawings, the following paragraphs provide an outline of a networked environment followed by a discussion of the operation of the same. FIG. 1 illustrates an example networked environment 10 for managed scatternet administration according to various examples described herein. The networked environment 10 includes a scatternet 12, a network 14 coupled to the scatternet 12, and various devices communicatively coupled to the networked environment 10 as described below. In the network, a Certificate Authentication Server (CAS) 14A is coupled to the scatternet 12 by the network 14.

Although the term "scatternet" is often used in the context of networks formed from one or more BLUETOOTH® piconets, the scatternet 12 need not be formed using any particular type or types of wireless communications standards. Instead, any suitable combination of wired and/or wireless communications standards can be used to form the scatternet 12 as described below. As shown in FIG. 1, the scatternet 12 includes one or more network layers including the network 20 and the sublayer networks 30-33. As organized in FIG. 1, the network 20 is representative of a top or first layer in the scatternet 12 and each of the sublayer networks 30-33 occupies a second layer in the scatternet 12. The scatternet 12 can also include additional sublayer networks at the same level as the sublayer networks 30-33 or branching off as one or more sublayers below (e.g., deeper than) the sublayer networks 30-33.

As shown in FIG. 1, the computing device 20A is communicatively coupled to and forms the network 20 in the scatternet 12. The computing device 20A is the top-level computing device and acts as an administrator to the other client devices in the scatternet 12. As for the other client devices in the scatternet 12, the client computing devices 30A-30D are communicatively coupled as and form the sublayer network 30, the client computing devices 31A-31C are communicatively coupled as and form the sublayer network 31, the client computing devices 32A-32D are communicatively coupled as and form the sublayer network 32, and the client computing devices 33A-33C are communicatively coupled as and form the sublayer network 33.

Among the client computing devices 30A-30D, the client computing device 30A operates as a sublayer propagator or master device for the sublayer network 30 and the client computing devices 30B-30D operate as slave devices. Similarly, the client computing device 31A operates as a sublayer propagator device for the sublayer network 31, the client computing device 32A operates as a sublayer propagator device for the sublayer network 32, and the client computing device 33A operates as a sublayer propagator device for the sublayer network 33. The structure of the scatternet 12 is representative in FIG. 1, and each of the sublayer networks 30-33 can include a greater or lesser number of client computing devices than that shown. In some cases, the number of client computing devices in any given one of the sublayer networks 30-33 can be limited based on the type of network protocols or standards used to establish it. For example, a piconet sublayer established using BLUETOOTH® can be limited to no more than one sublayer propagator device and seven client devices because of addressing constraints in BLUETOOTH® piconets. However, the number of client computing devices the sublayer networks 30-33 need not be limited to any number of devices in all cases.

In the scatternet 12, the network 20 and the sublayer networks 30-33 form a type of ad hoc computing device network. In one example, the network 20 and each of the sublayer networks 30-33 can be formed among the computing device 20A and the client computing devices 30A-30D, 31A-31C, 32A-32D, and 33-33C as one or more BLUETOOTH® networks. In other cases, physical layer communications circuitry and network protocol standards other than (or in addition to) BLUETOOTH® can be used to form one or more network layers or connections in the scatternet 12. For example, BLUETOOTH® can be used to form a first one of the sublayer networks 30-33 and WiFi Direct can be used to form a second one of the sublayer networks 30-33. As another example, WiFi Direct can be used in the scatternet 12 for a point-to-point connection between two devices. Further, other communications standards and protocols such as Near Field Communications (NFC) can be used to form one or more network layers in the scatternet 12.

As suggested in the previous paragraph, the computing device 20A and each of the client computing devices 30A-30D, 31A-31C, 32A-32D, and 33-33C can include one or more wired or wireless physical layer communications interfaces. The wired interfaces can support any suitable wired communications standards and protocols, and the wireless interfaces can support any suitable wireless communications standards and protocols, such as BLUETOOTH®, WiFi, and NFC, among others. Thus, the computing device 20A can include a first BLUETOOTH® physical layer communications interface to establish a first channel in the scatternet 12, a second WiFi physical layer communications interface to establish a second channel in the scatternet 12, and a third NFC physical layer communications interface to establish a third channel in the scatternet 12, among others. Similarly, each of the computing devices 30A-30D, 31A-31C, 32A-32D, and 33-33C can also include multiple types of wired or wireless physical layer communications interfaces.

Figure 2A:
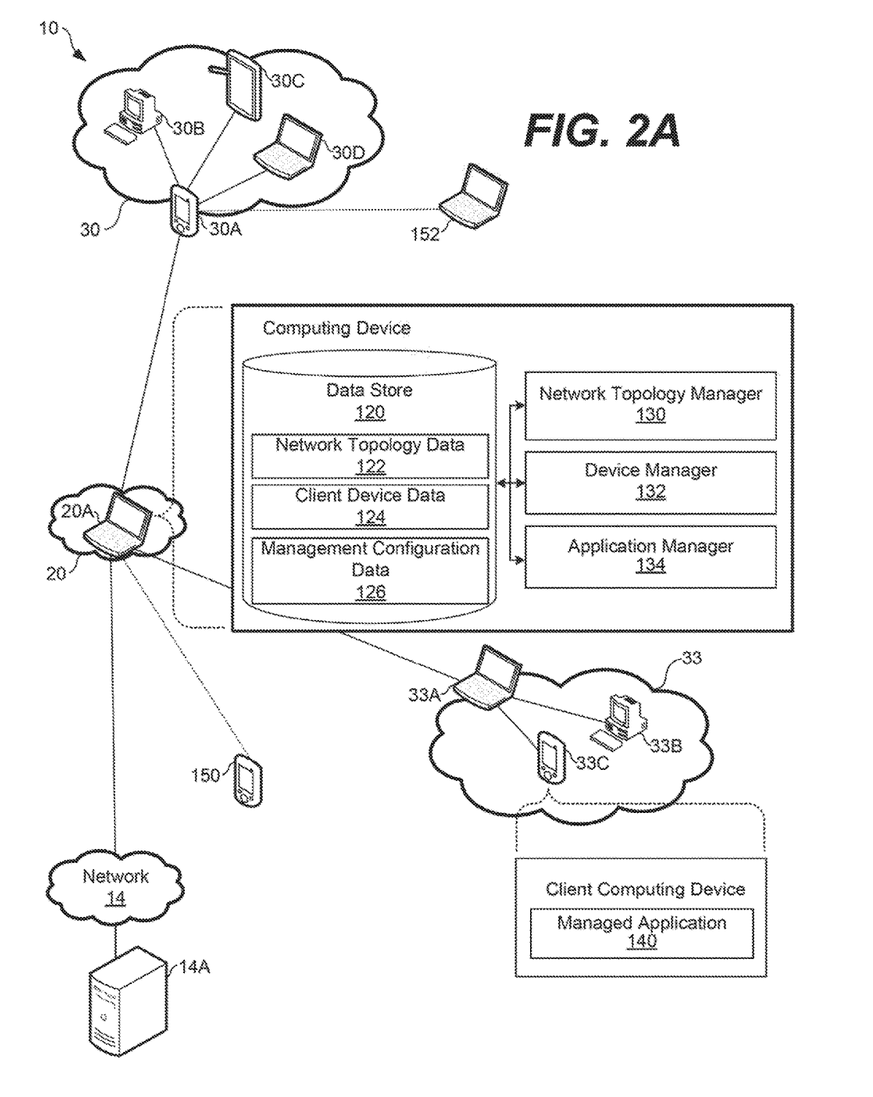
FIG. 2A illustrates examples of device administration in the networked environment shown in FIG. 1 according to various examples described herein.

The structure of the scatternet 12 is representative in FIG. 1 and can change over time as various devices request entry to and exit from the scatternet 12. The computing device 20A manages the structure of the scatternet 12 including the entry and exit of client devices to and from the scatternet 12 over time. The computing device 20A can also verify new client devices for entry to the scatternet 12, propagate network admission data to direct those new client devices to enter the scatternet 12 at certain locations, and securely forward one or more session encryption keys to the new client devices. Using the session encryption keys, communications sessions over the scatternet 12 can be secured among devices. Once secure communications sessions among client devices are established over the scatternet 12, the computing device 20A can manage operating characteristics of one or more applications executing on them. The computing device 20A can also manage operating characteristics of the client devices themselves. Thus, the scatternet 12 can be embodied as a network of managed client devices. The operations of the computing device 20A are described in further detail below with reference to FIG. 2.

The network 14 can include the Internet, intranets, extranets, wide area networks (WANs), local area networks (LANs), wired networks, wireless networks, cable networks, satellite networks, other suitable networks, or any combinations thereof. Although not shown in FIG. 1, the network 14 can also include communicative connections to any number and type of network hosts or devices, such as website servers, file servers, cloud computing resources, databases, data stores, or any other network or computing architectures.

In the networked environment 10, the computing device 20A can communicate with the CAS 120 and the client computing devices 30A-30D, 31A-31C, 32A-32D, and 33-33C using various data transfer protocols and systems interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (TP), transmission control protocol (TCP), other protocols and interconnect frameworks, and combinations thereof.

Each of the computing device 20A and the client computing devices 30A-30D, 31A-31C, 32A-32D, and 33-33C can be embodied as a computing device, processing circuit, or processor based device or system, including those in the form of a desktop computer, a laptop computer, a personal digital assistant, a wearable computing device, a cellular telephone, a set-top box, a music or media player, or a tablet computer, among other example computing devices and systems. Thus, the computing device 20A and the client computing devices 30A-30D, 31A-31C, 32A-32D, and 33-33C can be embodied, respectively, by the same, similar, or different types of hardware and hardware platforms, software platforms, and combinations of hardware and software platforms. Similarly, each of the computing device 20A and the client computing devices 30A-30D, 31A-31C, 32A-32D, and 33-33C can include various peripheral devices or components. The peripheral devices can include input or communications devices or modules, such as keyboards, keypads, touch pads, touch screens, microphones, cameras, various wired and/or wireless physical layer communications interfaces, buttons, switches, sensors, or other input or communications devices. The peripheral devices can also include a display, indicator lights, speakers, global positioning system (GPS) circuitry, accelerometers, gyroscopes, or other peripheral devices.

As further described below with reference to FIG. 2, the computing device 20A and the client computing devices 30A-30D, 31A-31C, 32A-32D, and 33-33C can also be embodied, in part, as certain functional (e.g., computer-readable instruction), logic (e.g., device, circuit, or processing circuit), or functional and logic elements. Those elements can be executed to direct the client devices, respectively, to perform aspects of managed device scatternet administration as described herein.

The CAS 14A can be embodied as a computer, computing device, or computing system. In certain embodiments, the CAS 14A can include one or more computing devices arranged, for example, in one or more server or computer banks. The computing device or devices can be located at a single installation site or distributed among different geographical locations. The CAS 14A can include a plurality of computing devices that together embody a hosted computing resource, a grid computing resource, or other distributed computing arrangement. In some cases, the CAS 14A can be embodied as an elastic computing resource where an allotted capacity of processing, network, storage, or other computing-related resources varies over time. As further described below, to achieve a secure network connection among the client devices in the scatternet 12, the CAS 14A is configured to verify the public keys provided to the computing device 20A from the client computing devices 30A-30D, 31A-31C, 32A-32D, and 33-33C.

FIG. 2A illustrates examples of device administration (e.g., network topology and client device management) in the networked environment 10 shown in FIG. 1. The sublayer networks 31 and 32 and the client computing devices 31A-31B and 32A-32D are omitted from view in FIG. 2A for the sake of simplicity. However, new client computing devices, including the client computing devices 150 and 152 are shown in FIG. 2A. As examples of managed device administration in the scatternet 12, the client computing devices 150 and 152 request entry to the scatternet 12 and become managed devices in the scatternet 12 as described later. Additionally, the client computing device 33A requests exit from the scatternet 12 as described in further detail below.

Introducing the other components shown in FIG. 2A, the computing device 20A includes a data store 120. Among other types, categories, or partitions of data, the data store 120 stores network topology data 122, client device data 124, and management configuration data 126. Also, among other components, the computing device 20A includes a network topology manager 130, a device manager 132, and an application manager 134. In other arrangements, the computing device 20A can include the device manager 132 and the application manager 134, but the operations of the network topology manager 130 can be performed or executed by one or more other computing devices coupled to the network 20. In other words, for flexibility, one or more of the network topology manager 130, the device manager 132, and the application manager 134 can be distributed among one or more top-level computing devices in the network 20.

The client computing device 33C includes a managed application 140 for execution. Other client computing devices in the scatternet 12 can execute one or more managed applications similar to the managed application 140. The managed application 140 can be embodied as a counterpart to the application manager 134 and, when executed, direct the client computing device 33C through the process of entry to the scatternet 12.

In the data store 120, the network topology data 122 includes data related to the structure or topology of the scatternet 12. For example, the network topology data 122 can include unique network addressing and unique device identification data for each of the client computing devices 30A-30D, 31A-31C, 32A-32D, and 33-33C, among others, in the scatternet 12. The network topology data 122 can also define the arrangement of the client computing devices 30A-30D, 31A-31C, 32A-32D, and 33-33C, among others, among the sublayer networks 30-33 in the scatternet 12. In that sense, the network topology data 122 is particularly related to the ad hoc structure of the scatternet 12 and can change over time.

As a more particular example, the network topology data 122 can be structured in a series of one or more tables or other data structures that define (or are representative of) the arrangement of the subnetwork layers and client devices in the scatternet 12, over time. For example, a sublayer network table in the network topology data 122 can list each of the sublayer networks 30-33 as an individual subnetwork of the higher-level network 20 in the scatternet 12. The network topology data 122 can also include data structures related to the client devices in each of the sublayer networks 30-33. For example, the network topology data 122 can include a sublayer network device list for each of the sublayer networks 30-33. Each sublayer network device list can include unique device identification data, such as Media Access Control (MAC) addresses, device serial numbers, or other addressing information associated with each of the client devices which are members of a given sublayer network.

The network topology data 122 can also define certain limits or preferences on the arrangement or structure of the scatternet 12 and the manner in which client devices can be added, removed, and reorganized in the scatternet 12. For example, the network topology data 122 can define a minimum number of client devices that must be present in each sublayer network before another sublayer network will be established. The network topology data 122 can also define a maximum number of client devices that can be present in any given sublayer network. The maximum number of devices can be defined based on the limits of network protocols, network signal strength, network latency, network data throughput, and other factors.

As described in further detail below, the computing device 20A can examine the network topology data 122 to identify an opening in the scatternet 12 for a new client device, to determine a reorganization of the client devices in the scatternet 12, and for other reasons. In that context, an opening in the scatternet 12 can be identified by examining the sublayer network device list for a given sublayer network, for example, to find whether fewer than the maximum number of client devices are members of the sublayer network. Similarly, by comparing multiple sublayer network device lists, the computing device 20A can determine which sublayer network has the fewest (or most) members. Then, the computing device 20A can place a new client device into a sublayer network having the least number of members, maintaining flatness in the network topology.

The client device data 124 can include unique device identification data for each of the client computing devices 30A-30D, 31A-31C, 32A-32D, and 33-33C, among others, coupled to the scatternet 12. In that context, the unique device identification data can include physical addressing data, such as MAC addresses, device serial numbers, or other addressing information or data of various client devices. The unique device identification data can also include username, password, and other types of unique identification data and session keys for communications between the computing device 20A and one or more of the client computing devices 30A-30D, 31A-31C, 32A-32D, and 33-33C.

The management configuration data 126 can include data related to the management of the client computing devices 30A-30D, 31A-31C, 32A-32D, and 33-33C, among others, coupled to the scatternet 12. In that context, the management configuration data 126 can be used for mobile device management to define certain operational parameters of the client devices coupled to the scatternet 12. The device manager 132 of the top-level computing device 20A can restrict client devices coupled to the scatternet 12 from performing certain operations, such as accessing certain applications or data, connecting to certain networks, or performing certain functions based on various rules or conditions defined by the management configuration data 126. Similarly, the device manager 132 can enforce various compliance rules or operational aspects of the client devices coupled to the scatternet 12 according to the management configuration data 126. Generally, by requesting access to the scatternet 12, each of the client computing devices 30A-30D, 31A-31C, 32A-32D, and 33-33C, has submitted to mobile device management at the direction of the device manager 132 of the computing device 20A.

The network topology manager 130 is configured to manage the entry and exit of client devices to and from the scatternet 12. Once client devices are permitted entry into the scatternet 12, the device manager 132 can manage one or more of their operational aspects and the application manager 134 can manage one or more of their applications based on (e.g., as defined by) the management configuration data 126. In particular, the application manager 134 can manage the managed application 140 executing on the client computing device 33C and similar applications executing on other client devices in the scatternet 12.

As an example of the entry or admission of a client device to the scatternet 12, the client computing device 150 requests entry. To request entry, the client computing device 150 contacts the computing device 20A. The client computing device 150 can contact the computing device 20A using a physical layer communications channel other than that used to form the scatternet 12. For example, the client computing device 150 can contact the computing device 20A using a WiFi Direct physical layer communications channel while the remainder of the scatternet 12 is formed using a BLUETOOTH® physical layer communications channel. In other cases, the client computing device 150 can contact the computing device 20A using the same physical layer communications channel as that used to form the scatternet 12.

When the client computing device 150 contacts the computing device 20A to request entry, the client computing device 150 provides a network entry request to the network topology manager 130 of the computing device 20A. The network entry request can include a unique identifier and public key of the client computing device 150. In one example case, the unique identifier can be embodied as a MAC addresses, device serial number, or other addressing information of the client computing device 150. The unique identifier can also include username, password, or other type of unique identification information. The username and password information can be associated with a managed application executing on the client computing device 150 similar to the managed application 140 executing on the client computing device 33C. Further, the public key can be associated with or provided as part of the managed application executing on the client computing device 150.

In response to the network entry request from the client computing device 150, the network topology manager 130 is configured to query the CAS 14A to obtain a verification result for the public key provided by the client computing device 150. Upon validation of the public key by the CAS 14A, the network topology manager 130 can proceed to examine the structure of the scatternet 12 to identify an opening for the client computing device 150 among one or more of the sublayer networks 30-33 (or, in some cases, in the network 20). Here, the network topology manager 130 can identify an opening for the client computing device 150 based on one or more network layout factors, such as network depth or network signal integrity factors. In one example case, the network topology manager 130 can place the client computing device 150 at an opening to maintain flatness in the network topology.

As for the network layout factors, the network topology manager 130 can place the client computing device 150 at the highest-level open location in the scatternet 12 before establishing new, deeper layers. If, however, all the highest-level positions are occupied, the network topology manager 130 can establish a new sublayer network in the scatternet 12 and place the client computing device 150 in that new sublayer network. Additionally or alternatively, the network topology manager 130 can place the client computing device 150 at one of the sublayer networks 30-33 based on a signal strength survey conducted by the client computing device 150, for example, or another device. In that way, the network topology manager 130 can place the client computing device 150 in one of the sublayer networks 30-33 which offers a relatively strong signal strength.

Continuing with the example for the client computing device 150, the network topology manager 130 identifies an open position for the client computing device 150 in the sublayer network 33. It is noted, however, that the network topology manager 130 could identify other open positions in other cases. To direct the client computing device 150 to enter the scatternet 12 at the sublayer network 33, the network topology manager 130 prepares and forwards network access data to the client computing device 150. The network access data can include a network address of the client computing device 33A, which is a sublayer propagator for the sublayer network 33A. The network access data can also include a session key for secure communications over the scatternet 12.

To maintain security in the administration of the scatternet 12, the network topology manager 130 first encrypts the network access data before forwarding it to the client computing device 150. In one example case, the network topology manager 130 encrypts the network access data by the public key provided in the network entry request from the client computing device 150 after it has been validated by the CAS 14A. Thus, upon validation of the public key by the CAS 14A, the network topology manager 130 can encrypt the network access data and the session key into encrypted network session data using the public key. In turn, the computing device 20A can forward the encrypted network session data to the client computing device 150 over the same physical layer communications channel used by the client computing device 150 to request entry to the scatternet 12.

Figure 2B:
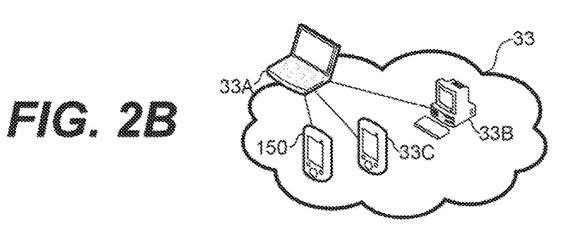
FIGS. 2B-D illustrate other network topologies of the networked environment shown in FIG. 1, over time, according to various examples described herein.

The network topology manager 130 can also send client admission data to the client computing device 33A, which operates as a sublayer propagator or master device for the sublayer network 33, to advise it that the client computing device 150 has been admitted entry to the scatternet 12 at the sublayer network 33. Among other data, the client admission data can include a unique identifier for the client computing device 150 and a copy of the session key for communications with the client computing device 150. Based on the client admission data, when the client computing device 150 requests entry as a slave device in the sublayer network 33, the sublayer propagator or master client computing device 33A recognizes the client computing device 150 as being admitted and opens a secure communications session with it. In this case, the network topology of the scatternet 12 has changed, as shown in FIG. 2B, where the client computing device 150 is a member of the sublayer network 33. The network topology manager 130 can also update the network topology data 122 to account for the addition of the client device 150 to the scatternet 12 as shown in FIG. 2B.

Once the secure communications session has been opened, the device manager 132 can dispatch configuration data and/or rules stored in the management configuration data 126 to the client computing device 33A. In turn, the configuration data and rules can be forwarded by the client computing device 33A to the client computing device 150. The configuration data and rules can restrict the client computing device 150 from performing certain operations, such as accessing certain applications or data, connecting to certain networks, or performing certain functions based on various rules or conditions defined by the management configuration data 126. Similarly, the management configuration data 126 can enforce various compliance rules or operational aspects of the client computing devices 150. Once permitted access to the scatternet 12, the client computing device 150 has submitted to mobile device management at the direction of the device manager 132 of the computing device 20A.

Similarly, once the secure communications session has been opened with the client computing device 150, the application manager 134 can manage one or more applications executing on the client computing device 150. In that way, computing device 20A can control or restrict the operation of the display screen, camera, microphone, speaker, and other peripherals of the client computing device 150 as well as the operation of various applications executing on it.

As another example of the entry of a client device to the scatternet 12, the client computing device 152 requests entry. In that context, the client computing device 152 contacts the client computing device 30A in the sublayer network 30. The client computing device 152 can contact the client computing device 30A using a same or different physical layer communications channel used to form the scatternet 12. When the client computing device 152 requests entry, the client computing device 152 provides a network entry request to the client computing device 30A. In this case, the client computing device 30A forwards the network entry request to the network topology manager 130 of the computing device 20A. The network entry request can include a unique identifier and public key of the client computing device 152.

In response to the network entry request from the client computing device 152, the network topology manager 130 is configured to query the CAS 14A to obtain a verification result for the public key provided by the client computing device 152. Upon validation of the public key by the CAS 14A, the network topology manager 130 can proceed to examine the structure of the scatternet 12 to identify an opening for the client computing device 152 among one or more of the sublayer networks 30-33. Again, the network topology manager 130 can identify an opening for the client computing device 150 based on one or more network layout factors, such as network depth or network signal integrity factors.

The network topology manager 130 identifies an open position for the client computing device 152 in the sublayer network 30, but could identify other open positions. To permit the client computing device 152 to enter the scatternet 12 at the sublayer network 30, the network topology manager 130 sends client admission data to the client computing device 30A to advise it that the client computing device 152 has been admitted entry to the scatternet 12 at the sublayer network 30. Among other data, the client admission data can include a unique identifier for the client computing device 152 and a copy of a session key for communications with the client computing device 152. The network topology manager 130 can also encrypt network access data for the client computing device 152 and dispatch it to the client computing device 30A.

Figure 2C:
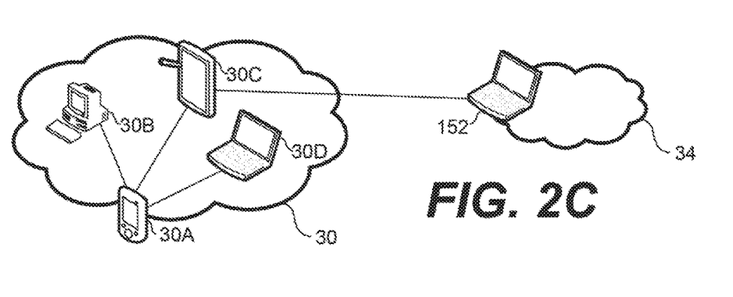

Based on the client admission data, the client computing device 30A recognizes the client computing device 152 as being admitted to the scatternet 12, forwards the encrypted network access data to the client computing device 152, and opens a secure communications session with the client computing device 152. In this case, the network topology of the scatternet 12 has changed, as shown in FIG. 2C, where the client computing device 152 is a member of the sublayer network 30. The network topology manager 130 can also update the network topology data 122 to account for the addition of the client device 152 to the scatternet 12 as shown in FIG. 2C.

Again, once the secure communications session has been opened, the device manager 132 can dispatch configuration data and/or rules to the client computing device 30A. In turn, the configuration data and rules can be forwarded by the client computing device 30A to the client computing device 152. Further, the application manager 134 can manage one or more applications executing on the client computing device 152. In that way, the computing device 20A can control or restrict the operation of the display screen, camera, microphone, speaker, and other peripherals of the client computing device 152 as well as the operation of various applications executing on it.

Over time, client computing devices can also exit the scatternet 12. To the extent necessary, the network topology manager 130 can determine a topology reorganization for the scatternet 12 or one or more of the sublayer networks 30-33 in response to a client computing device exiting the scatternet 12. In various cases, client computing devices can request the network topology manager 130 to exit the scatternet 12 or the network topology manager 130 can determine whether one or more client computing devices have exited without a request.

Figure 2D:
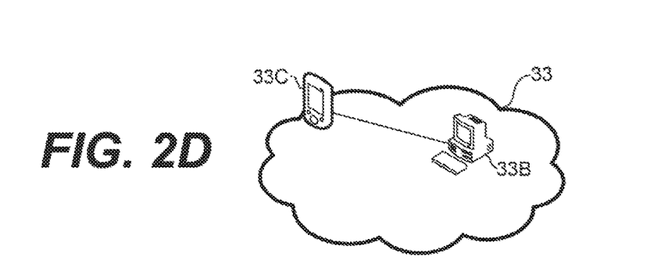

As one example, the client computing device 33A, which operates as a sublayer propagator device for the sublayer network 33, can forward a network exit request to the network topology manager 130. In turn, the network topology manager 130 can examine the sublayer network 33 to determine a topology reorganization for that network sublayer. The topology reorganization can include the selection of a new sublayer propagator device for the sublayer network 33. If the client computing device 33C were selected, for example, the network topology manager 130 of the computing device 20A can dispatch reorganized topology plan data to the client computing device 33C. The reorganized topology plan data can identify the reorganized structure of the sublayer network 33, including which client computing devices are master and slave devices, and can be stored in the network topology data 122. The computing device 20A can dispatch the reorganized topology plan data to the client computing device 33C using a same or different physical layer communications channel used to form the scatternet 12. The computing device 20A can also instruct the client computing device 33C to operate as the sublayer propagator device for the sublayer network 33 in accordance with the topology reorganization. The result of this reorganization is shown in FIG. 2D.

In other cases, the client computing device 33A can exit the scatternet 12 without forwarding a network exit request to the network topology manager 130. In that case, the computing device 20A can identify that the client computing device 33A has exited the scatternet 12 by the lack of network communications by the computing device 20A, for example, or through a message from a client computing device on the sublayer network 33. Referring to FIG. 2A, the client computing device 33B can send a sublayer failure message to the computing device 20A if the client computing device 33A has failed to maintain network communications (e.g., has gone silent) for a certain period of time. The sublayer failure message can be sent to the computing device 20A using a same or different physical layer communications channel used to form the scatternet 12. In any case, the network topology manager 130 can examine the sublayer network 33 to determine a topology reorganization for that network sublayer if the client computing device 33A has exited the scatternet 12.

Figure 3A:
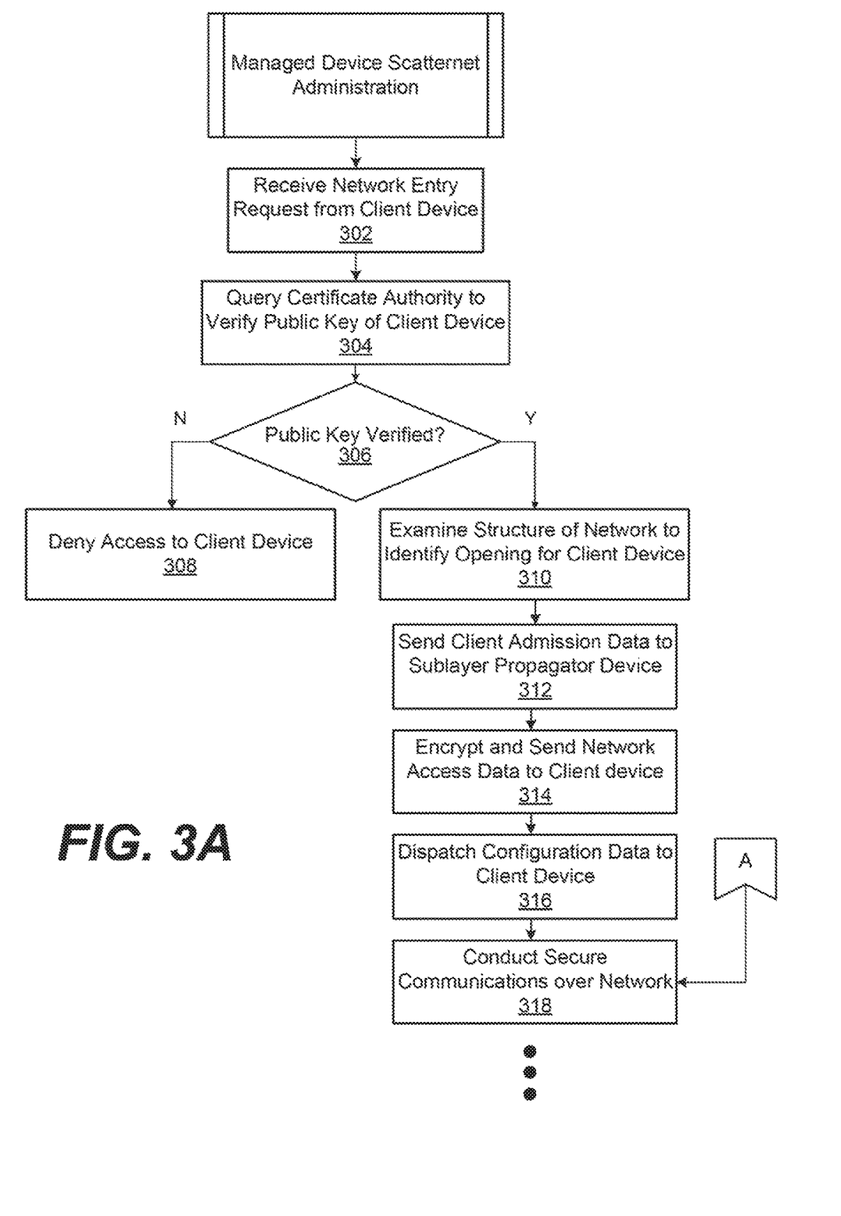
FIG. 3A illustrates a process for managed scatternet administration according to various examples described herein.

FIG. 3A illustrates a process for managed scatternet administration according to various examples described herein. Although the process is described below as being performed by the computing device 20A in FIG. 1, the process can be performed by other, similarly configured computing devices or systems.

At step 302, the process includes the client computing device 20A receiving a network entry request from a client device to access or enter the scatternet 12. The network entry request can be received directly from the client device or through a sublayer propagator device of one of the sublayer networks 30-33, as described herein. Further the network entry request can be received using a same or different physical layer communications channel used to form the scatternet 12. Among other data, the network entry request can include a unique identifier and public key of the client device requesting access.

At step 304, the process includes the network topology manager 130 querying the CAS 14A to obtain a verification result for the public key provided by the client device requesting access. At step 306, the process includes the network topology manager 130 determining whether the public key is valid based on a verification result received from the CAS 14A in response to the query at step 304. If the verification result from the CAS 14A does not confirm that the public key is a valid public key in a public/private key pair, then the process proceeds to step 308. Otherwise, if the verification result from the CAS 14A confirms that the public key is valid, then the process proceeds to step 310.

At step 308, the process includes the network topology manager 130 denying access to the client device requesting access. For example, the network topology manager 130 can refuse to distribute client admission and client access data for the client requesting access. In that case, the client device will not be permitted entry into the scatternet 12, and the process can end.

At step 310, the process includes the network topology manager 130 examining the structure of the scatternet 12 to identify an opening for the client device requesting access. The opening can be identified from among one or more of the sublayer networks 30-33 (or, in some cases, in the network 20). Here, the network topology manager 130 can identify an opening for the client computing device 150 based on one or more network layout factors, such as the network depth or network signal integrity factors described herein. Additionally or alternatively, the network topology manager 130 can review the network topology data 122 to identify the opening based on the sublayer network device lists for the sublayer networks 30-33. The sublayer network device lists for the sublayer networks 30-33 can be referenced to identify whether fewer than the maximum number of client devices are members in those networks. As another example, the network topology manager 130 can determine which sublayer network has the fewest (or most) members and place a new client device into a sublayer network having the least number of members, maintaining flatness in the network topology, or conforming to another network requirement.

At step 312, the process includes the network topology manager 130 sending client admission data to the sublayer propagator device having the opening identified at step 310. In that way, the sublayer propagator device can be advised that the client device requesting access has been admitted entry to the scatternet 12. Among other data, the client admission data can include a unique identifier for the client device and a copy of a session key for communications with the client device requesting access.

At step 314, the process includes the network topology manager 130 encrypting and sending network access data to the client device requesting access. The network access data can include a network address of the sublayer propagator device for the sublayer network having the opening for the client device requesting access. The network access data can also include a session key for secure communications over the scatternet 12 as described herein.

The communication of the client admission data and the network access data at steps 312 and 314 can be achieved using a same or different physical layer communications channel used to form the scatternet 12. Also the communication of the client admission data and the network access data need not occur in any particular order or sequence. In other words, steps 312 and 314 can occur concurrently, with partial concurrence, or in a sequence other than that shown in FIG. 3A.

At step 316, the process includes the device manager 132 dispatching configuration data and/or rules to the client device requesting access. Based on the configuration data and/or rules, the device manager 132 can restrict the client device requesting access from performing certain operations, such as accessing certain applications or data or performing certain functions, for example, based on various rules or conditions defined by the management configuration data 126. Similarly, the device manager 132 can enforce various compliance rules or operational aspects of the client device requesting access according to the management configuration data 126. At step 316, the process configures the client device requesting access as a managed device in the scatternet 12.

At step 318, the client device has been admitted to the scatternet 12 at step 310, and the process includes the application manager 134 conducting secure communications with the client device. During those secure communications, the application manager 134 can manage one or more applications executing on the client device. In that way, the computing device 20A can control or restrict the operation of the display screen, camera, microphone, speaker, and other peripherals of the client device and the operation of various applications executing on the client device, for example.

Figure 3B:
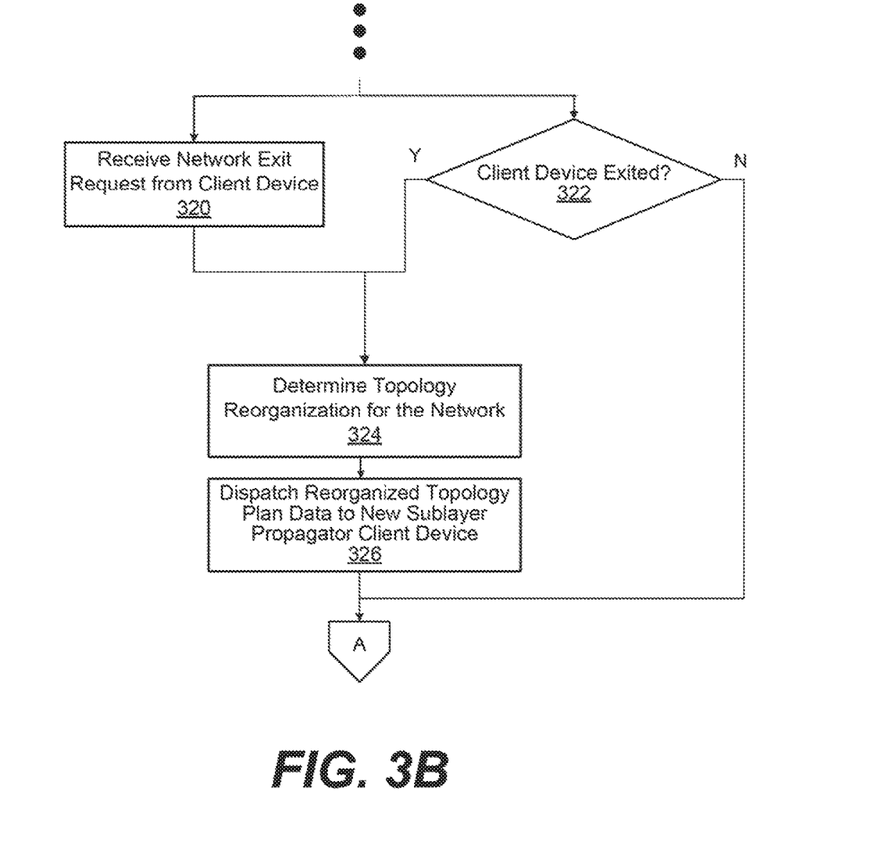
FIG. 3B further illustrates the process for managed scatternet administration shown in FIG. 3A according to various examples described herein.

Turning to FIG. 3B, the process shown in FIG. 3A is continued. As described above, client devices can also exit the scatternet 12 over time. In that context, as shown in FIG. 3B, the network topology manager 130 can receive a network exit request from a client device at step 320 or can determine whether a client devices has exited without a request at step 322. Alternatively, at step 322, the network topology manager 130 can determine whether a client device has exited the scatternet 12 by a lack of network communications with the client device or a message from another client device. From either step 320 or 322, if the client device has requested to exit or has been determined to exit the scatternet 12, the process proceeds to step 324. From step 322, if the client device is determined to still be a member of the scatternet 12, the process proceeds to step 318 in FIG. 3A.

At step 324, the process includes the network topology manager 130 determining a topology reorganization for the scatternet 12 in view of the exited client device in the scatternet 12. The topology reorganization can include the selection of a new sublayer propagator device, if necessary, in place of the exited client device. Particularly if the exited client device was a sublayer propagator device (e.g., one of the client computing devices 30A-33A in FIG. 1), the network topology manager 130 can determine a topology reorganization which includes the selection of a new sublayer propagator device.

Once the network topology manager 130 has determined a suitable topology reorganization, the process includes the network topology manager 130 dispatching reorganized topology plan data to new sublayer propagator device at step 326. The reorganized topology plan data can identify a reorganized structure of the sublayer network which the exited client device was previously a member of, including which client computing devices are master and slave devices. The computing device 20A can dispatch the reorganized topology plan data to the new sublayer propagator device using a same or different physical layer communications channel used to form the scatternet 12. Additionally, the computing device 20A can instruct the new sublayer propagator device to operate as the exited client device in accordance with the reorganized topology plan data. After the scatternet 12 is appropriately reorganized, the process proceeds back to step 318 in FIG. 3A to continue communications over the scatternet 12.

The flowcharts of FIGS. 3A and 3B show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The computing device 20A, the client computing devices 30A-30D, 31A-31C, 32A-32D, 33-33C, 150, and 152 described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the network topology manager 130, device manager 132, application manager 134, and/or other components can be stored in one or more storage devices and be executable by one or more processors in the computing device 20A. Also, a data store, such as the data store 120 can be stored in the one or more storage devices.

The network topology manager 130, device manager 132, application manager 134, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the network topology manager 130, device manager 132, and application manager 134 can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

What is claimed is:

1. A non-transitory computer-readable medium embodying program code executable in at least one computing device, the program code being configured to cause the at least one computing device to at least:
   receive a network entry request from a client device;
   examine a structure of a network to identify an opening for the client device in a network sublayer of the network in response to the network entry request;
   transmit network access data to the client device, the network access data comprising a network address of a sublayer propagator device for the network sublayer having the opening;
   transmit client admission data to the sublayer propagator device, the client admission data comprising a unique identifier for the client device and a session key for communications with the client device; and
   dispatch configuration data for the client device to the sublayer propagator device.

2. The non-transitory computer-readable medium according to claim 1, wherein the network entry request from the client device is received through a first physical layer communications channel in the network, and the client admission data is forwarded to the sublayer propagator device through a second physical layer communications channel in the network.

3. The non-transitory computer-readable medium according to claim 1, the program code being further configured to cause the at least one computing device to at least identify the opening for the client device in the network among a plurality of openings in a plurality of network sublayers of the network based on a network layout factor.

4. The non-transitory computer-readable medium according to claim 3, wherein the network layout factor includes at least one of a network signal integrity factor or a network depth factor.

5. The non-transitory computer-readable medium according to claim 1, wherein:
   the network entry request includes a device identifier and a public key associated with the client device; and
   the program code is further configured to cause the at least one computing device to at least:
      query a certificate authority to obtain a verification result for the public key;
      encrypt at least one of the network access data or the session key into encrypted network session data using the public key based on the verification result; and
      forward the encrypted network session data to the client device.

6. The non-transitory computer-readable medium according to claim 1, the program code being further configured to cause the at least one computing device to at least:
   receive, from a second sublayer propagator device, a second network entry request from a second client device;
   examine the network to identify a second opening for the second client device in a second network sublayer of the network; and
   forward second client admission data to the second sublayer propagator device, the second client admission data comprising a second unique identifier for the second client device and a second session key for communications with the second client device.

7. The non-transitory computer-readable medium according to claim 1, the program code being further configured to cause the at least one computing device to at least:
   receive a network exit request from a second client device in a second network sublayer of the network, the second client device operating as a second sublayer propagator device for the second network sublayer;
   examine the second network sublayer to determine a topology reorganization for the second network sublayer in response to the network exit request;
   dispatch reorganized topology plan data for the topology reorganization to a third client device in the second network sublayer; and
   instruct the third client device to operate as the second sublayer propagator device for the second network sublayer in accordance with the topology reorganization.

8. The non-transitory computer-readable medium according to claim 1, the program code being further configured to cause the at least one computing device to at least:
   determine that a second client device is no longer communicatively coupled in the network, the second client device being configured as a second sublayer propagator device for a second network sublayer of the network;
   in response to the second client device being no longer communicatively coupled in the network, examine the second network sublayer to determine a topology reorganization for the second network sublayer;
   dispatch reorganized topology plan data for the topology reorganization to a third client device in the second network sublayer; and
   instruct the third client device to operate as the second sublayer propagator device for the second network sublayer in accordance with the topology reorganization.

9. A method, comprising:
   establishing, by at least one computing device, a network for managed device administration of a plurality of client devices, the network comprising a scatternet of the plurality of client devices;

receiving, by at least one computing device, a network exit request from a client device among the plurality of client devices, the client device operating as a sublayer propagator device for a network sublayer of the network;

examining, by at least one computing device, the network sublayer to determine a topology reorganization for the network sublayer in response to the network exit request;

dispatching, by at least one computing device, reorganized topology plan data for the topology reorganization to a second client device in the network sublayer; and instructing, by the at least one computing device, the second client device to operate as the sublayer propagator device for the network sublayer in accordance with the topology reorganization.

10. The method of claim 9, wherein the network sublayer comprises a piconet in the scatternet.

11. The method of claim 9, wherein the network exit request from the client device is received through a first physical layer communications channel in the network, and the reorganized topology plan data is forwarded to second client device through a second physical layer communications channel in the network.

12. The method of claim 9, further comprising:
receiving, by the at least one computing device, a network entry request from a third client device, the network entry request comprising a unique device identifier and a public key;

querying, by the at least one computing device, a certificate authority to obtain a verification result for the public key;

examining, by the at least one computing device, a structure of the network to identify an opening for the third client device in the network based on the verification result;

encrypting, by the at least one computing device, at least one of network access data or a session key into encrypted network session data using the public key based on the verification result; and forwarding, by the at least one computing device, the encrypted network session data to the third client device over the network.

13. The method of claim 12, further comprising transmitting, by the at least one computing device, client admission data to the second client device operating as the sublayer propagator device for the network sublayer, the client admission data comprising a unique identifier for the third client device and the session key for communications with the third client device.

14. The method of claim 13, further comprising identifying, by the at least one computing device, the opening for the third client device in the network among a plurality of openings in a plurality of network sublayers of the network based on a network layout factor.

15. A method, comprising:
querying, by at least one computing device, a certificate authority to obtain a verification result for a public key of a client device requesting entry to a network;

based on a verification result for the public key, examining, by the at least one computing device, a structure of a network to identify an opening for a client device in the network;

transmitting, by the at least one computing device, client admission data to a sublayer propagator device of a network sublayer having the opening in the network, the client admission data comprising a unique identifier for the client device and a session key for communications with the client device;

transmitting, by the at least one computing device, network access data to the client device, the network access data comprising a network address of the sublayer propagator device and the session key; and dispatching, by the at least one computing device, configuration data for the client device to the sublayer propagator device.

16. The method of claim 15, further comprising identifying, by the at least one computing device, the opening for the client device in the network among a plurality of openings in a plurality of network sublayers of the network based on a network layout factor.

17. The method of claim 15, wherein the network comprises a scatternet and the network sublayer comprises a piconet in the scatternet.

18. The method of claim 15, further comprising:
receiving, by the at least one computing device, a network entry request from a second client device;

examining, by the at least one computing device, the network to identify a second opening for the second client device in a second network sublayer of the network; and forwarding, by the at least one computing device, second client admission data to a second sublayer propagator device, the second client admission data comprising a second unique identifier for the second client device and a second session key for communications with the second client device.

19. The method of claim 15, further comprising:
receiving, by the at least one computing device, a network exit request from a second client device in a second network sublayer of the network, the second client device operating as a second sublayer propagator device for the second network sublayer;

examining, by the at least one computing device, the second network sublayer to determine a topology reorganization for the second network sublayer in response to the network exit request; and dispatching, by the at least one computing device, reorganized topology plan data for the topology reorganization to a third client device in the second network sublayer.

20. The method of claim 15, further comprising:
determining, by the at least one computing device, that a second client device is no longer communicatively coupled in the network, the second client device being configured as a second sublayer propagator device for a second network sublayer of the network;

in response to the second client device being no longer communicatively coupled in the network, examining, by the at least one computing device, the second network sublayer to determine a topology reorganization for the second network sublayer; and dispatching, by the at least one computing device, reorganized topology plan data for the topology reorganization to a third client device in the second network sublayer.

* * * * *